W. W. COWLING.
MACHINE FOR RAISING BLOCKS OF ICE.

No. 5,145. Patented June 5, 1847.

UNITED STATES PATENT OFFICE.

WILLIS W. COWLING, OF RICHMOND, VIRGINIA.

MACHINERY FOR RAISING ICE FROM PONDS, &c.

Specification of Letters Patent No. 5,145, dated June 5, 1847.

*To all whom it may concern:*

Be it known that I, WILLIS W. COWLING, of Richmond, in the county of Henrico and State of Virginia, have invented a new and useful Machine for Raising Blocks of Ice from the Water, and that the following is a full, clear, and exact description of the principle or character which distinguishes it from all other things before known and of the manner of making, constructing, and using the same, reference being had to the accompanying drawings, making part of this specification, in which—

Figure 1:
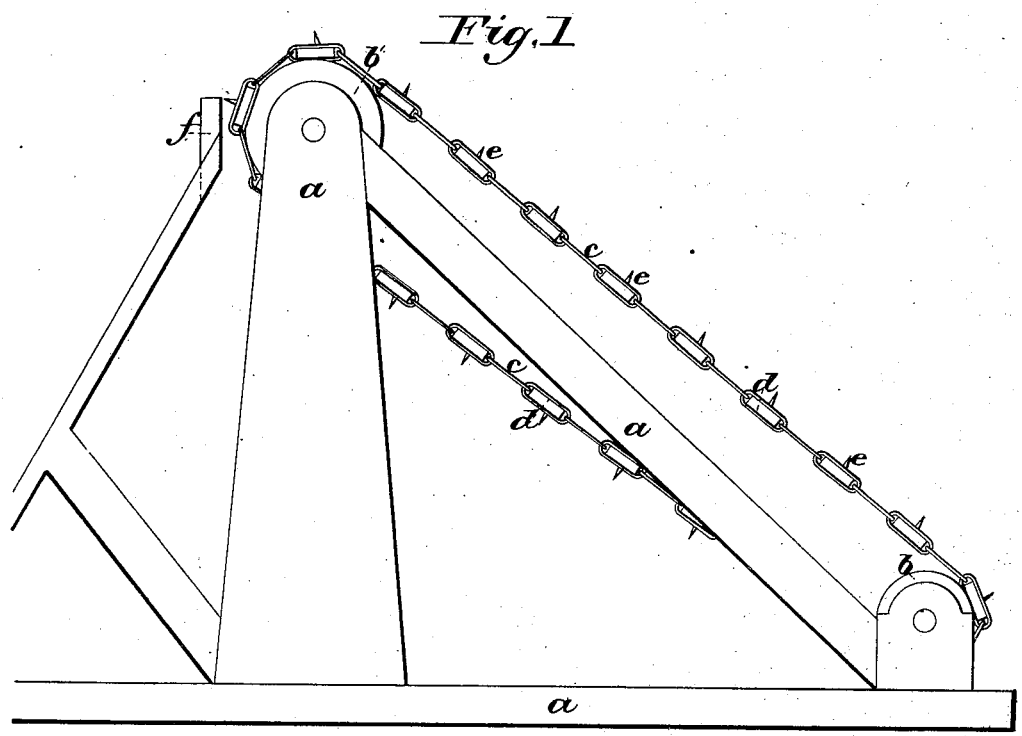
Figure 2:
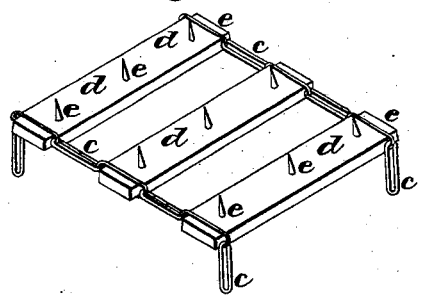

Figure 1 is an elevation of the machine, and Fig. 2 a plan of a portion of the belt.

The same letters indicate like parts in all the figures.

The nature of my invention consists in the employment of an inclined endless belt or chain of slats that passes around two rollers, one placed below the surface of the water and the other as high as it is desired to raise the blocks of ice,—the slats being provided with sharp metal pins or points that stick into the blocks of ice and hold on to them sufficiently to carry them up the inclined plane and deliver them at top by the passing of the belt around the upper roller.

In the accompanying drawings (*a*) represents a frame properly adapted to the purpose, and (*b, b'*) two rollers, the one (*b*) below the surface of the water, and the other (*b'*) at any height above the surface. Around these rollers passes a belt formed of two chains (*c, c,*) and connecting slats (*d*), and the upper surface of these slats is armed with sharp metal pins (*e, e, e*). Power is applied to the upper roller (*b'*) by any desired means to carry the belt in the direction of the arrow, so that as the blocks of ice are pushed toward the belt they are caught by the pins (*e*) which stick into them sufficiently to be carried up and thrown over by the motion of the belt around the upper roller. So soon as the blocks of ice pass over a vertical line passing through the axis of the roller they tip over onto a bar (*f*) which liberates them from the pins and suffers them to slide down the inclined plane to the place of deposit.

The frame in which the rollers have their bearings may be permanently erected in the water, or the frame, with the machinery connected therewith may be made portable. It will be obvious that the slats may be connected with the chains in any desired manner, or that the chains may be dispensed with by connecting the slats together with hinges or straps, to make an endless belt, to which the sharp metallic points or pins may be attached.

I am aware that endless chains passing around rollers have been used for elevating various articles, and that the slats of the chains have also been provided with projecting wooden pins similar to rake teeth as in machines for removing straw from threshing machines; but none of these will answer the purpose contemplated by me, for the sharp metallic points are necessary to catch and hold onto the blocks of ice sufficiently to elevate them, and to hold them until they are tilted when discharged at top.

What I claim as my invention and desire to secure by Letters Patent, is—

The method of elevating blocks of ice from the water by means of an endless belt or chain provided with sharp metallic points, substantially as described.

WILLIS W. COWLING.

Witnesses:
O. P. BROWNE,
J. J. GREENOUGH.